US008528008B2

(12) United States Patent
Lu et al.

(10) Patent No.: US 8,528,008 B2
(45) Date of Patent: Sep. 3, 2013

(54) METHOD FOR PROGRAM PROTECTION BASED ON .NET CARD AND A SYSTEM THEREOF

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 876 days.

(21) Appl. No.: 12/411,629

(22) Filed: Mar. 26, 2009

(65) Prior Publication Data

US 2009/0249373 A1 Oct. 1, 2009

(30) Foreign Application Priority Data

Apr. 1, 2008 (CN) .......................... 2008 1 0103240

(51) Int. Cl.
*G06F 3/00* (2006.01)
*G06F 9/45* (2006.01)

(52) U.S. Cl.
USPC ............ 719/331; 719/330; 719/328; 717/139

(58) Field of Classification Search
None
See application file for complete search history.

(56) References Cited

U.S. PATENT DOCUMENTS

| | | | | |
|---|---|---|---|---|
| 6,810,518 | B1* | 10/2004 | Grimaud et al. | 717/139 |
| 7,707,631 | B2* | 4/2010 | Bruecklmayr et al. | 717/139 |
| 7,913,265 | B2* | 3/2011 | Grimaud et al. | 719/331 |
| 2002/0082847 | A1* | 6/2002 | Vandewalle et al. | 719/330 |
| 2002/0103810 | A1* | 8/2002 | Menachemi et al. | 707/102 |
| 2004/0031016 | A1* | 2/2004 | Vaidyanathan et al. | 717/110 |
| 2005/0097364 | A1* | 5/2005 | Edeki et al. | 713/201 |
| 2005/0108736 | A1* | 5/2005 | Schwabe et al. | 719/331 |
| 2005/0138649 | A1* | 6/2005 | Schwabe | 719/328 |
| 2007/0000995 | A1* | 1/2007 | Sachdeva et al. | 235/380 |
| 2007/0033291 | A1* | 2/2007 | Prevost | 709/238 |
| 2007/0226752 | A1* | 9/2007 | Davis et al. | 719/313 |
| 2008/0022380 | A1* | 1/2008 | Lu et al. | 726/9 |
| 2008/0115117 | A1* | 5/2008 | Wilkinson et al. | 717/139 |
| 2009/0125643 | A1* | 5/2009 | Prevost et al. | 710/10 |

OTHER PUBLICATIONS

"Embedding Formally Proved Code in a Smart Card: Converting B to C", Requet, 2000, pp. 1-8.*
"RMI Client Application Programming Interface", Java Card 2.2, 2002, pp. 1-78.*
Advanced Control Flow in Java Card Programming, Li, 2004, pp. 1-10.*

* cited by examiner

*Primary Examiner* — Tuan Dao
(74) *Attorney, Agent, or Firm* — Workman Nydegger

(57) ABSTRACT

A method and system for program protection based on a .NET card. The method includes compiling, by a first device, first source code into a first assembly, and storing the first assembly to a .NET card. Information of a remotely invoked class in the first source code is extracted to form a new class. A remote invocation instruction is written in the new class to generate second source code. The second source code is compiled into a second assembly, and the .NET card and the second assembly are provided to a second device. The second device executes the second assembly, remotely invoking the class in the first source code, executing the class at the .NET card via an interface of the .NET card, and receiving an execution result returned by the .NET card. The system includes a .NET card, a first device and a second device.

11 Claims, 2 Drawing Sheets

METHOD FOR PROGRAM PROTECTION BASED ON .NET CARD AND A SYSTEM THEREOF

This application claims the benefit of Chinese Patent Application 200810103240.9, titled "A METHOD FOR PROGRAM PROTECTION BASED ON A .NET CARD AND A SYSTEM THEREOF", filed with the Chinese Patent Office on Apr. 1, 2008, which is hereby incorporated by reference in its entirety

FIELD OF THE INVENTION

The present invention relates to the field of information security and in particular to a method for program protection based on a .NET card and a system thereof.

BACKGROUND OF THE INVENTION

As Microsoft's new-generation technical platform, .NET is a new and Internet-based language-neutral software development platform, conforming to the trend of distributed computing, component-oriented development, enterprise-oriented application, Software-as-a-Service and Web-centered development in the software industry. .NET is not a programming language. Multiple programming languages are supported by the .NET platform. A prominent feature of .NET is its support for interactions via Web between users and various smart devices, with controls administrated by the user instead of an application. Therefore the experience with Microsoft .NET brought by smart devices connected with XML Web services is personalized and comprehensive. The smart devices are tools having Web functions, such as personal computers, handhelds and smart phones. With installed software, these devices are more intelligent while interacting with users, networks, information and other devices and services.

A virtual machine can be viewed as a software emulation of a machine with hardware such as processer, memory and register, by which various instructions can be emulated. There are no special requirements for the runtime environment by software running on the machine; hence the virtual machine is transparent to the programs running on it. For example, an x86 virtual machine emulates a runtime environment of x86 instructions and programs, and a c51 virtual machine emulates a runtime environment of c51 instructions and programs.

As Remote Method Invocation (RMI) develops, it has been implemented with many frameworks such as DCE/RPC, CORBA, DCOM, MTS/COM+, Java RMI, Java EJB, Web Services/SOAP/XML-RPC and .NET Remoting. Microsoft .NET Remoting provides a framework allowing objects to interact with one another via an application domain. It is known that Web services only provide a simple and more understandable implementation of cross-platform and language-neutral interactions. .NET Remoting is a significant change to Web services, like Asp to CGI. .NET Remoting provides an extendable framework supporting different transmission mechanisms (built-in HTTP and TCP), different encoding rules (SOAP and binary code) and security configurations (IIS or SSL) while providing various services such as activation and life cycle support.

However, Microsoft .NET Remoting normally imports service-side DLLs to an assembly for compiling and executing, which is not suitable for privilege separation. Moreover, if the content is important and confidential, disclosing the imported contents would be harmful for program protection to those developers.

A .Net card is a smart card with embedded microprocessor which can execute .NET programs.

SUMMARY OF THE INVENTION

In order to improve the security of a program while being remotely invoked, a method and a system for program protection based on a .NET card are provided.

A method for program protection based on a .NET card is provided, including:

compiling, by a first device, first source code into a first assembly, and storing the first assembly to a .NET card; extracting, by the first device, a namespace and a method of a remotely invoked class in the first source code to form a new class, writing in the new class a remote invocation instruction for remotely invoking the class in the first source code to generate second source code, compiling the second source code into a second assembly, and providing the .NET card and the second assembly to a second device;

executing the second assembly, by the second device after obtaining the .NET card and the second assembly, remotely invoking the class in the first source code, executing the class at the .NET card via an interface of the .NET card, and receiving an execution result returned by the .NET card.

The second device remotely invokes the class in the first source code via a client channel and receives the execution result returned by the .NET card via a service channel; the client channel implements an IChannelSender interface and an IChannel interface of Microsoft, the service channel implements an IChannelReceiver interface and an IChannel interface of Microsoft.

The client channel and the service channel communicate via a PS/SC, HID or SCSI intereface.

The first source code is written in C#, VB.NET, J# or C++; the second source code is written in C#, VB.NET, J# or C++.

The first assembly stored in the .NET card is a .NET managed DLL file which can be invoked by other assemblies.

A system for program protection based on a .NET card includes: a .NET card, a first device and a second device.

The .NET card includes:
a storage module adapted to store a first assembly obtained by compiling first source code;
an interface module adapted to communicate with the second device when the first assembly stored in the storage module is invoked by the second device;
an execution module adapted to execute the first assembly when the first assembly stored in the storage module is invoked by the second device.

The first device includes:
a parsing module adapted to parse and obtain a remotely invoked class in the first source code;
a processing module adapted to extract a namespace and a method of the class obtained by the parsing module to form a new class, and write in the new class an instruction for remotely invoking the class in the first source code to generate second source code;
a compiling module adapted to compile the first source code into the first assembly, and compile the second source code obtained by the processing module into a second assembly.

The second device includes:
a storage module adapted to store the second assembly generated by the compiling module of the first device;

an invocation module adapted to execute the second assembly stored in the storage module of the second device, and invoke the first assembly stored in the .NET card via an interface of the .NET card when the remote invocation instruction is executed, and receive an execution result returned by the .NET card via the interface of the .NET card.

The parsing module is a syntactic parser.

The first source code is written in C#, VB.NET, J# or C++; the second source code is written in C#, VB.NET, J# or C++.

The first assembly stored in the storage module of the .NET card is a .NET managed DLL file which can be invoked by other assemblies.

The invocation module of the second device is adapted to execute the second assembly stored in the storage module of the second device, invoke the first assembly stored in the .NET card via a client channel of the second device when the remote invocation instruction is executed, and receive the execution result returned by the .NET card via a service channel of the .NET card; the client channel implements an IChannelSender interface and an IChannel interface of Microsoft, the service channel implements an IChannelReceiver interface and an IChannel interface of Microsoft.

The client channel and the service channel communicate via a PS/SC, HID or SCSI interface.

Technical effects brought about by the above solutions are:

Protected source code is compiled into an assembly and written into a .NET card, and a new assembly including a remote invocation instruction is generated based on a remotely invoked class in the source code. Therefore a user can add the new assembly directly to his project and use, which is easy and may reduce the workload. Furthermore, the assembly written to the .NET card is prevented from being disclosed, thereby guaranteeing the safety of the code.

DETAILED DESCRIPTION OF THE INVENTION

Objects, technical solutions and advantages of the invention will be easily understood by reference to the following description of embodiments when read in conjunction with the accompanying drawings.

A method for program protection based on a .NET card is provided according to an embodiment of the invention, including: compiling, by a first device, first source code into a first assembly, and storing the first assembly in a .NET card; extracting, by the first device, a namespace and a method of a remotely invoked class in the first source code to form a new class, writing in the new class a remote invocation instruction for remotely invoking the class in the first source code to generate second source code, compiling the second source code into a second assembly, and providing the .NET card and the second assembly to a second device; executing the second assembly, by the second device on receipt of the .NET card and the second assembly, remotely invoking the class in the first source code, executing the class at the .NET card via an interface of the .NET card, and receiving an execution result returned by the .NET card.

Embodiment 1

Figure 1:
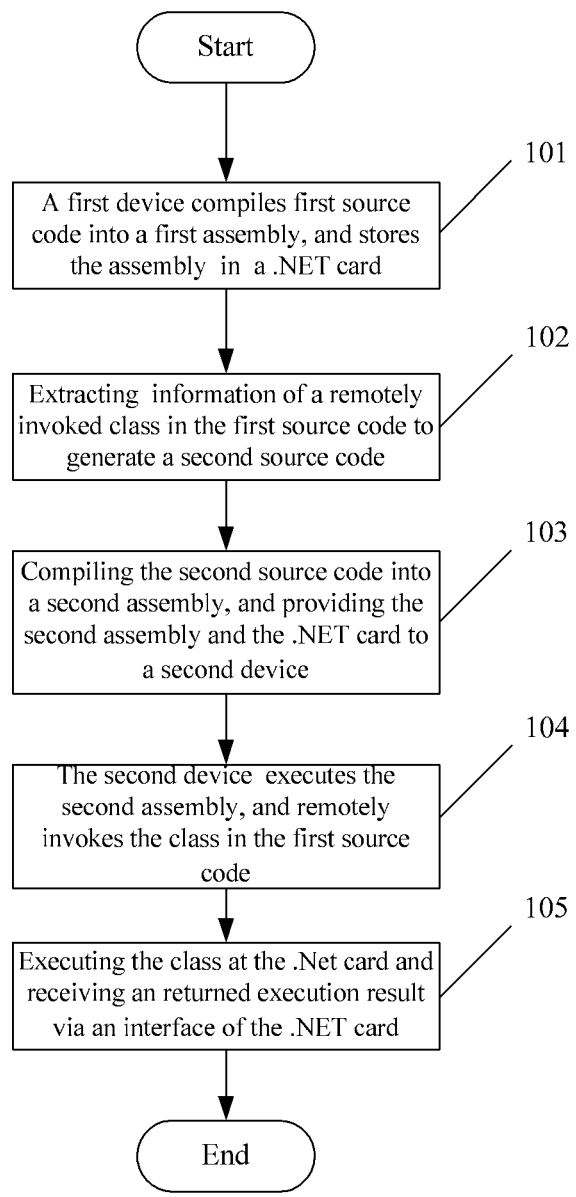
FIG. 1 is a flow chart illustrating a method for program protection based on a .NET card according to an embodiment of the invention.

With reference to FIG. 1, a method for program protection based on a .NET card is provided according to an embodiment of the invention. The method includes:

Step 101: a first device compiles first source code into a first assembly, and stores the first assembly in a .NET card, normally an internal storage of the .NET card.

In this embodiment, the first source code is written in C++ by a software developer, and provided to a .NET card producer. The .NET card producer compiles the first source code into the first assembly and stores the first assembly in the .NET card. In practice, the first source code can also be written in C#, VB.NET or J#. In the embodiment, the first device is a device of the .NET card producer for operations such as compiling, parsing, and processing.

In addition, the first assembly above is a .NET managed DLL file which can be invoked by other assemblies.

Step 102: the first device parses a remotely invoked class in the first source code, extracts a namespace and a method of the remotely invoked class in the first source code to form a new class, and writes in the new class a remote invocation instruction for remotely invoking the class in the first source code to generate second source code.

Parsing the first source code includes obtaining, by the .NET card producer, the integrated environment information by using a plug-in, and parsing the remotely invoked class in the first source code by using a parser. In the embodiment, the parser is a syntactic parser, the new class is formed by empty functions, and both the remotely invoked class and the new class above are classes that inherit the MarshalByRefObject class.

Step 103: the first device compiles the second source code into a second assembly, and provides the second assembly and the .NET card to a second device.

Generally, the steps 101 to 103 are performed by the .NET card producer who receives the first source code using the .NET card and corresponding software. In the embodiment, both the second assembly and the .NET card are provided to a user by the .NET card producer, so that the user can select a class to be invoked from the second assembly according to actual situations and performs a related operation with the .NET card.

Step 104: the second device executes the second assembly after obtaining the second assembly and the .NET card, and remotely invokes the class in the first source code.

In the embodiment, the second device is a device of a .NET card user. Before executing the second assembly, the .NET card user who obtains the second assembly and the .NET card writes the second assembly completely in an application that the user develops. While running, if necessary, the application invokes the second assembly written in the application, and the second assembly further invokes a corresponding class in the first assembly stored in the .NET card, and completes execution of the application.

Step 105: when the remote invocation instruction in the second assembly is executed, the second device executes the class corresponding to the instruction in the .NET card, and receives a returned execution result via an interface of the .NET card. The application containing the second assembly continues running at that time.

In the embodiment, specifically, the remote invocation instruction is remoting. When the second assembly in the application is executed, an application-side Client Framework is invoked according to the remote invocation instruction. The Client Framework includes a client channel ClientChannel which invokes the first assembly according to the ISO7816 protocol. The first assembly is executed in the .NET card, after which the .NET card returns the execution result to the client channel ClientChannel via a service channel of the .NET card ServerChannel. The communication between the client channel ClientChannel and the service channel ServerChannel can be done via a PC/SC, HID or SCSI interface. The service channel ServerChannel built in the .NET card implements an IChannelReceiver interface and an IChannel interface of Microsoft. The client channel ClientChannel built in the client framework implements an IChannelSender interface and an IChannel interface of Microsoft.

Embodiment 2

Figure 2:
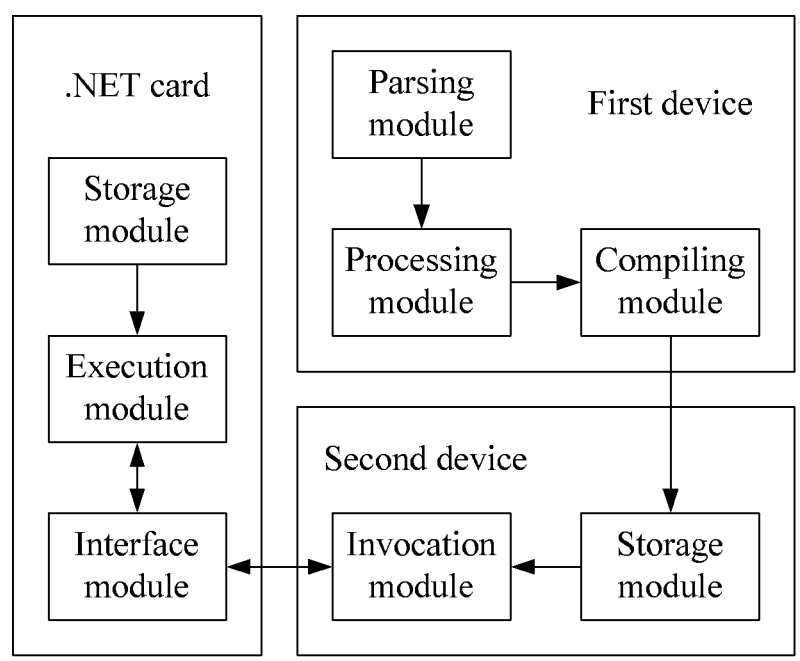
FIG. 2 is a structural diagram illustrating a system for program protection based on a .NET card according to another embodiment of the invention.

With reference to FIG. 2, a system for program protection based on a .NET card is provided according to an embodiment of the invention. The system includes a .NET card, a first device and a second device.

The .NET card includes:

A storage module adapted to store a first assembly obtained by compiling first source code. In the embodiment, the first source code is written in C++ by a software developer, and provided to a .NET card producer. The .NET card producer compiles the first source code into the first assembly and stores the first assembly in the .NET card.

An interface module adapted to communicate with the second device when the first assembly stored in the storage module is invoked by the second device. Specifically, the .NET card receives invocation information from the second device via the interface module. An execution result is sent to the second device via the interface module when the invocation is completed.

An execution module adapted to execute the first assembly when the first assembly stored in the storage module is invoked by the second device. In the embodiment, the first assembly is executed inside the .NET card.

The first device includes:

A parsing module adapted to parse and obtain a remotely invoked class in the first source code. In the embodiment, the parsing module is a syntactic parser which is invoked after the integrated environment information is obtained by a plug-in;

A processing module adapted to extract a namespace and a method of the class obtained by the parsing module to form a new class, and write in the new class a remote invocation instruction for remotely invoking the new class in the first source code to generate second source code. The new class is formed by empty functions; and both the remotely invoked class obtained by the parsing module and the new class are classes that inherit the MarshalByRefObject class.

A compiling module adapted to compile the first source code into the first assembly, and compile the second source code obtained by the processing module into a second assembly;

The second device includes:

A storage module adapted to store the second assembly generated by the compiling module of the first device;

An invocation module adapted to execute the second assembly stored in the storage module of the second device, invoke the first assembly stored in the .NET card via an interface of the .NET card when the remote invocation instruction is executed, and receive the execution result returned by the .NET card via an interface of the .NET card.

In the embodiment, the first device is a device of a .NET card producer; the second device is a device of a .NET card user. The second assembly generated by compiling the second source code and the .NET card are provided to the user, and the user can add the second assembly to a project and the second assembly can be invoked when the project is executed.

The second assembly invokes the corresponding class in the .NET card according to the remote invocation instruction. Specifically, the remote invocation instruction is remoting.

Furthermore, the invocation module of the second device is adapted to execute the second assembly stored in the storage of the second device; invoke the first assembly stored in the .NET card via a client channel ClientChannel when the remote invocation instruction is executed, and receive the execution result returned by the .NET card via a service channel of the .NET card ServerChannel.

Specifically, while executing the second assembly in the application, the invocation module of the second device invokes an application-side Client Framework. The Client Framework includes a client channel ClientChannel which invokes the first assembly according to the ISO7816 protocol. The first assembly is executed in the .NET card, after which the .NET card returns the execution result to the client channel ClientChannel via a service channel of the .NET card ServerChannel. The communication between the client channel ClientChannel and the service channel ServerChannel can be done via a PC/SC, HID or SCSI interface. The service channel ServerChannel built in the .NET card implements an IChannelReceiver interface and an IChannel interface of Microsoft. The client channel ClientChannel built in the client framework implements an Microsoft IChannelSender interface and an IChannel interface of Microsoft.

In the embodiment, the first source code can be written in C#, VB.NET, J# or C++; the second source code can be written in C#, VB.NET, J# or C++.

In the embodiment, the first assembly stored in the .storage module of the .NET card is a .NET managed DLL file which can be invoked by other assemblies.

According to the embodiments, protected source code is compiled into an assembly and written to a .NET card, and a new assembly including a remote invocation instruction is generated based on a remotely invoked class in the source code. Therefore a user can add the new assembly directly to his project for use, which is easy and may reduce the workload. Furthermore, the assembly written to the .NET card is prevented from being disclosed, thereby guaranteeing the safety of the code.

Preferred embodiments are described above, which is not intended to limit the invention. Any modification, equivalents and improvement without departing from the spirit and principle of the invention should be included in the scope of the invention.

The invention claimed is:

1. A method for program protection based on a smart card, comprising:

compiling, by a first device, first source code into a first assembly, and storing the first assembly to a smart card;

extracting, by the first device, a namespace and a method of a remotely invoked class in the first source code to form a new class, writing in the new class a remote invocation instruction for remotely invoking the class in the first source code to generate second source code, compiling the second source code into a second assembly, and providing the smart card and the second assembly to a second device, wherein the new class is formed by an empty function;

executing the second assembly, by the second device after obtaining the smart card and the second assembly, remotely invoking the class in the first source code, executing the class at the smart card via an interface of the smart card, and receiving an execution result returned by the smart card.

2. The method for program protection based on a smart card according to claim 1, wherein
the second device remotely invokes the class in the first source code via a client channel and receives the execution result returned by the smart card via a service channel; the client channel implements an IChannelSender interface and an IChannel interface, the service channel implements an IChannelReceiver interface and an IChannel interface.

3. The method for program protection based on a smart card according to claim 2, wherein the client channel and the service channel communicate via a Personal Computer/Smart Card (PS/SC), Human Interface Device (HID) or Small Computer System Interface (SCSI) interface.

4. The method for program protection based on a smart card according to claim 1, wherein
the first source code is written in C#, VB.NET, J# or C++;
the second source code is written in C#, VB.NET, J# or C++.

5. The method for program protection based on a smart card according to claim 1, wherein
the first assembly stored in the smart card is a smart managed DLL file which can be invoked by other assemblies.

6. A system for program protection based on a smart card, comprising a smart card, a first device and a second device, wherein
the smart card comprises:
a storage module adapted to store a first assembly obtained by compiling first source code;
an interface module adapted to communicate with the second device when the first assembly stored in the storage module is invoked by the second device;
an execution module adapted to execute the first assembly when the first assembly stored in the storage module is invoked by the second device,
the first device comprises:
a parsing module adapted to parse and obtain a remotely invoked class in the first source code;
a processing module adapted to extract a namespace and a method of the class obtained by the parsing module to form a new class, and write in the new class an instruction for remotely invoking the class in the first source code to generating second source code, wherein the new class is formed by an empty function;
a compiling module adapted to compile the first source code into the first assembly, and compile the second source code obtained by the processing module into a second assembly,
the second device comprises:
a storage module adapted to store the second assembly generated by the compiling module of the first device;
an invocation module adapted to execute the second assembly stored in the storage module of the second device, and invoke the first assembly stored in the smart card via an interface of the smart card when the remote invocation instruction is executed, and receive an execution result returned by the smart card via the interface of the smart card.

7. The system for program protection based on a smart card according to claim 6, wherein
the parsing module is a syntactic parser.

8. The system for program protection based on a smart card according to claim 6, wherein
the first source code is written in C#, VB.NET, J# or C++;
the second source code is written in C#, VB.NET, J# or C++.

9. The system for program protection based on a smart card according to claim 6, wherein
the first assembly stored in the storage module of the smart card is a smart managed DLL file which can be invoked by other assemblies.

10. The system for program protection based on a smart card according to claim 6, wherein
the invocation module of the second device is adapted to execute the second assembly stored in the storage module of the second device, invoke the first assembly stored in the smart card via a client channel of the second device when the remote invocation instruction is executed, and receive the execution result returned by the smart card via a service channel of the smart card; the client channel implements an IChannelSender interface and an IChannel interface, the service channel implements an IChannelReceiver interface and an IChannel interface.

11. The system for program protection based on a smart card according to claim 10, wherein
the client channel and the service channel communicate via a Personal Computer/Smart Card (PS/SC), Human Interface Device (HID) or Small Computer System Interface (SCSI) interface.

* * * * *